Patented Dec. 5, 1939

2,181,906

UNITED STATES PATENT OFFICE 2,181,906

MANUFACTURE OF CELLULOSE ESTERS

Clemmy O. Miller and Arthur E. Siehrs, Chicago, Ill., assignors to North American Rayon Corporation, New York, N. Y., a corporation of Delaware No Drawing. Application November 30, 1937, Serial No. 177,388. Renewed October 6, 1939

18 Claims. (Cl. 260—224)

This application is a continuation in part of our application Serial No. 589,974, filed January 30, 1932, and is particularly concerned with the production of cellulose esters from alkali metal cellulosates. It may also be useful in the preparation of esters of carbohydrates of similar constitution, such as starch and other carbohydrates. It is therefore to be understood where the term cellulose is used it is intended to cover treatment of similar materials wherever found advantageous.

In the manufacture of cellulose acetate, taking it as an example of the manufacture of cellulose esters, cellulose is treated with a mixture of acetic acid and acetic anhydride. During the reaction a part of the acetic anhydride is converted into acetic acid. In the ordinary methods of the manufacture of cellulose acetate it is customary to employ a certain amount of sulfuric acid as a catalyst. The present process consists of a simpler method for the production of cellulose acetate. It is also applicable to the preparation of other cellulose esters.

The present invention comprises the production of cellulose esters by the reaction of esterifying agents with alkali metal cellulosates under substantially anhydrous conditions. By esterifying agents it is intended to include aliphatic acyl halides, such as, for example, acetyl halides, propionyl halides, butyryl halides and aromatic acyl halides, for instance, benzoyl halides and crotonyl halides. The halides include bromine, chlorine, iodine and fluorine. It is also intended to include aliphatic and aromatic acid anhydrides, such as, for example, acetic anhydride, propionic anhydride, and benzoic acid anhydride.

In carrying out the invention cellulosic materials such as cotton, cotton linters, wood pulp, regenerated cellulose and mono or di substituted alkali metal cellulosates may be reacted in liquid ammonia with alkali metals, such as sodium, potassium, lithium, rubidium and caesium and preferably with potassium or sodium. This reaction is preferably carried out at about the boiling point of liquid ammonia at atmospheric pressure, i. e., about −28° F. but may also be carried out at higher temperatures up to a maximum of approximately 266° F. or to a lower minimum of approximately −107.2° F., higher pressures up to approximately 115° atmospheres being used with higher temperatures and, if desired, lower pressures down to about 0.1 atmosphere being used with lower temperatures. If desired swelling agents which are sufficiently soluble in liquid ammonia but do not react with the liquid ammonia, such as, for example, alkali metal and ammonium-halides and-thiocyanates may be present during the reaction with the alkali metal.

The alkali metal cellulosate resulting from the above described reaction, or from other sources, may then be reacted under substantially anhydrous conditions with the esterifying agent. This reaction may be carried out in the absence of an inert solvent, although it is preferred to have such a solvent present. This inert solvent should be one which does not react with the cellulosate or with the esterifying agent. It may be an excess of the esterifying agent. Other examples of suitable inert solvents are acetone, benzone, toluene, ethers, pyridine etc.

As a specific example of the procedure described above, four parts of dried cellulose may be reacted with one part of sodium in 50 parts of anhydrous liquid ammonia. To one part of the sodium cellulosate, thus formed, is added about 40 parts of acetone and 30 parts of acetyl chloride. The reaction mixture is warmed until the desired acetylation has taken place and is then cooled to room temperature. Cellulose acetate may subsequently be precipitated by addition of water or ether, etc. The product is soluble in chloroform.

Other esterifying agents, as indicated above, may be used in place of acetyl chloride.

While air-dry cellulose and commercial anhydrous ammonia can be used, we prefer to use drier materials because the sodium is used more sparingly on account of none being needed to react with water. It is preferred to carry out the production of the alkali metal cellulosate and the esterification under substantially anhydrous conditions in order to avoid loss of the ingredients used, such as the alkali metal and esterifying agent, or of the cellulosate. Varying amounts of the alkali metal can be used, up to the proportion of one part of sodium to two parts of cellulose or even in excess of this amount. Other methods usable for producing the alkali metal cellulosate are described in our above mentioned copending application. We have cited a preparation in which we use acetyl chloride; however, under similar conditions, acid anhydrides and other acyl halides may be used. Also, potassium or other alkali metals may be used in place of the sodium. Both organic and inorganic esterifying can be used in this method. Other esters of cellulose may be prepared substantially like cellulose acetate.

The conversion of the cellulosic material to alkali metal cellulosate or the esterification of the alkali metal cellulosate may be carried out in the presence of inert solvents which are miscible with liquid ammonia and which do not react with it or with the reacting ingredients. For instance alcohols, hydrocarbons or esters, which are inert in the reaction in which they are used may be present.

We claim:

1. A method of preparing cellulose esters which comprises reacting anhydrous alkali metal cellulosates with an esterifying agent selected from the group consisting of organic acid halides and organic acid anhydrides.

2. A method of preparing cellulose esters which comprises reacting anhydrous alkali metal cellulosates with an esterifying agent in the presence of an inert solvent.

3. A method of preparing cellulose esters which comprises treating cellulosic material with an alkali metal in liquid ammonia and reacting the resulting product with an esterifying agent selected from the group consisting of organic acid halides and organic acid anhydrides.

4. A method of preparing cellulose esters which comprises treating cellulosic material with an alkali metal in liquid ammonia and reacting the resulting product with an esterifying agent in the presence of an inert solvent.

5. A method of preparing cellulose esters which comprises reacting anhydrous alkali metal cellulosates with an acyl halide.

6. A method of preparing cellulose esters which comprises treating cellulosic material with an alkali metal in liquid ammonia and reacting the resulting material with an acyl halide in the presence of an inert solvent.

7. A method of preparing cellulose esters which comprises reacting an anhydrous alkali metal cellulosate with an acetyl halide.

8. A method of preparing cellulose esters which comprises treating cellulosic material with an alkali metal in liquid ammonia and reacting the resulting product with an acetyl halide in the presence an inert solvent.

9. A method of preparing cellulose esters which comprises treating cellulosic material with an alkali metal in liquid ammonia and reacting the resulting product with acetyl chloride.

10. A method of preparing cellulose esters which comprises treating cellulosic material with an alkali metal in liquid ammonia and reacting the resulting product with acetyl chloride in the presence of acetone.

11. A method of preparing cellulose esters which comprises reacting an anhydrous alkali metal cellulosate with an organic acid anhydride.

12. A method of preparing cellulose esters which comprises treating cellulosic material with an alkali metal in liquid ammonia and reacting the resulting product with an organic acid anhydride in the presence of an inert solvent.

13. A method of preparing cellulose esters which comprises reacting anhydrous alkali metal cellulosates with an organic acid halide.

14. A method of preparing cellulose esters which comprises reacting anhydrous alkali metal cellulosates with a benzoyl halide.

15. A method of preparing cellulose esters which comprises reacting anhydrous alkali metal cellulosates with acetic anhydride.

16. A method of preparing cellulose esters which comprises reacting anhydrous alkali metal cellulosates with an esterifying agent selected from the group consisting of organic acid halides and organic acid anhydrides under substantially anhydrous conditions.

17. A method of preparing cellulose esters which comprises reacting anhydrous alkali metal cellulosates with an organic acid halide under substantially anhydrous conditions.

18. A method of preparing cellulose esters which comprises reacting an anhydrous alkali metal cellulosate with an organic acid anhydride under substantially anhydrous conditions.

CLEMMY O. MILLER.
ARTHUR E. SIEHRS.